Aug. 16, 1955

C. JOHNSON 2,715,389

HYDRO-PNEUMATIC POWER MECHANISMS
AND CYCLING CONTROLS THEREFOR

Filed Dec. 19, 1949

INVENTOR.
CLARENCE JOHNSON
BY Ralph C. Dustin
ATTORNEY

Aug. 16, 1955

C. JOHNSON 2,715,389

HYDRO-PNEUMATIC POWER MECHANISMS
AND CYCLING CONTROLS THEREFOR

Filed Dec. 19, 1949

INVENTOR
Clarence Johnson

BY Strauch, Nolan & Diggins
ATTORNEYS

Aug. 16, 1955  C. JOHNSON  2,715,389
HYDRO-PNEUMATIC POWER MECHANISMS
AND CYCLING CONTROLS THEREFOR
Filed Dec. 19, 1949  4 Sheets-Sheet 3

INVENTOR
Clarence Johnson

BY Strauch, Nolan & Diggins
ATTORNEYS

Aug. 16, 1955

C. JOHNSON 2,715,389

HYDRO-PNEUMATIC POWER MECHANISMS
AND CYCLING CONTROLS THEREFOR

Filed Dec. 19, 1949

INVENTOR
Clarence Johnson

BY Strauch, Nolan & Diggins
ATTORNEYS

United States Patent Office 2,715,389
Patented Aug. 16, 1955

2,715,389

HYDRO-PNEUMATIC POWER MECHANISMS AND CYCLING CONTROLS THEREFOR

Clarence Johnson, South Euclid, Ohio, assignor, by mesne assignments, to The Hartford Special Machinery Company, Hartford, Conn., a corporation of Connecticut Application December 19, 1949, Serial No. 133,922

27 Claims. (Cl. 121—45)

The present invention relates to hydro-pneumatic power mechanisms and more particularly to hydro-pneumatic power mechanisms adapted for automatic relative feeding of a workpiece and a machine tool.

While hydro-pneumatic power mechanisms per se are well known in the art, the present invention has for its primary object the provision of an improved power feed mechanism of unit construction having simplified self contained control elements.

It is a further important object of this invention to provide a reciprocating hydro-pneumatic motor adapted to operate at different speeds through different portions of its strokes.

Such motors are particularly adapted for use in the operation of milling machines, drill presses, machine lathes, or any machine or machines where members, such as a tool and workpiece are to be moved at different rates of speed in the same or opposite directions for the sake of efficiency. In the case of a machine tool and workpiece, it is desirable that the motor be adapted to effect relatively rapid movement of the tool and workpiece into and out of operative working relation and relatively slow feed movement during working engagement of the tool. It is also desirable that the lengths of the fast and slow movements be variable and that the rate of movement through any portion of the reciprocatory stroke also be variable to accommodate any number of varying conditions met in practice.

A further important object of this invention, therefore, resides in the provision of a hydro-pneumatic motor wherein a fluid operated piston serves as a power piston and two or more liquid control pistons are arranged, to be moved in unison with the power piston at a predetermined rate of speed, determined by the rate of flow of the liquid, throughout an initial portion of the power piston stroke in one direction to provide a rapid movement of the power piston and, thereafter, automatically and for the remainder of the power piston stroke in the same direction to undergo relative movement at a lesser predetermined rate or rates determined by the rate of flow of the liquid.

Another object of the present invention resides in providing a pneumatic power piston with a hydraulic control system comprising a body of liquid adapted to act on one or more relatively movable fluid control pistons in a manner to vary the flow of liquid from one to another predetermined rate of flow in accord with the position of the power piston along its path of movement.

Still another object of this invention resides in the provision of an improved fluid actuated motor of the reciprocating type.

Another object of this invention resides in the provision of a motor having a fluid actuated piston and a hydraulic piston control means permitting movement of the piston at fast and slow speeds through different portions of its stroke in one direction, and at a fast speed through its full stroke in the opposite direction.

It is a further object of the present invention to provide an extremely compact hydro-pneumatic unit adapted particularly for use as an automatic drill head.

To this end, a preferred form of my invention contemplates a liquid backed pneumatically actuated flow inducing power piston, bladder, diaphragm, bulb or the like and one or more flow responsive pistons or like elements in separate intercommunicating chambers acted upon by the backing liquid to move in unison with or relative to said power element to vary the flow of liquid through the several chambers and thereby automatically control the length of stroke and rate of movement of said power element.

A preferred form of my invention may include pistons actuated by a pressure fluid in separate chambers which communicate with each other through flow control passages. Liquid contained within the chambers may be forced through the passages at different rates determined by presetting of valves or fixed orifices in the passages for regulating the speed at which the pistons may be moved by the pressure fluid. The drilling implement is fixed for movement longitudinally with one of the pistons, and is operatively connected to a power unit for rotation by the latter as it is reciprocated. By providing means for switching the supply of pressure fluid to the pistons in response to the pressure of the liquid in the system, there may be obtained an automatic reversal of piston movement when travel in one direction is stopped either by engagement of one of the pistons with a stationary abutment or by failure of the drill to cut its way through the material.

Still another object of this invention is to provide improved means for reversing the direction of travel of a drilling implement.

Further objects will appear from the description and appended claims when read in conjunction with the attached drawings wherein:

The present application is a continuation-in-part of applicant's copending applications Serial Number 792,721 filed December 19, 1947, entitled Drill Mechanisms; Serial Number 23,289 filed April 26, 1948, entitled Fluid Motors and allowed June 20, 1949; and Serial Number 116,073 filed September 16, 1949, entitled Power Systems, all now abandoned.

Figure 1:
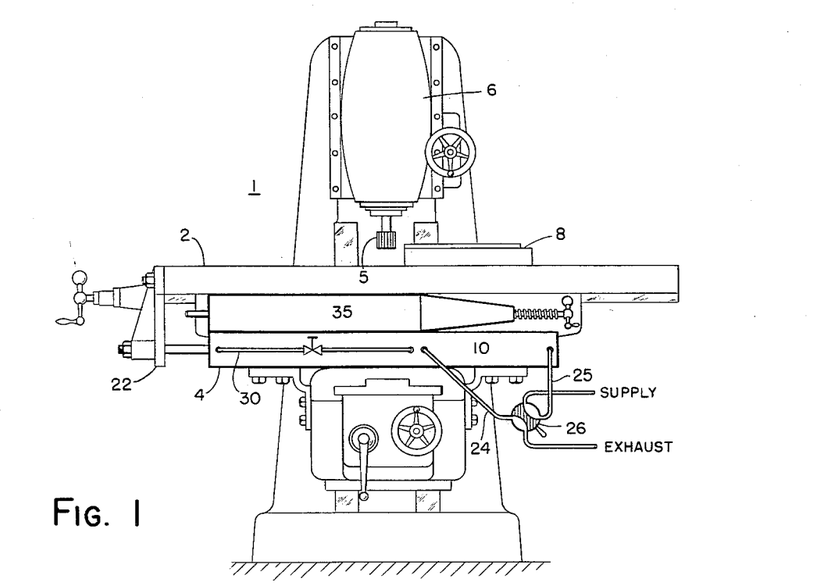
Figure 1 is a schematic diagram of a milling machine having an improved motor embodying the present invention associated therewith to reciprocate the table.
Figure 2:
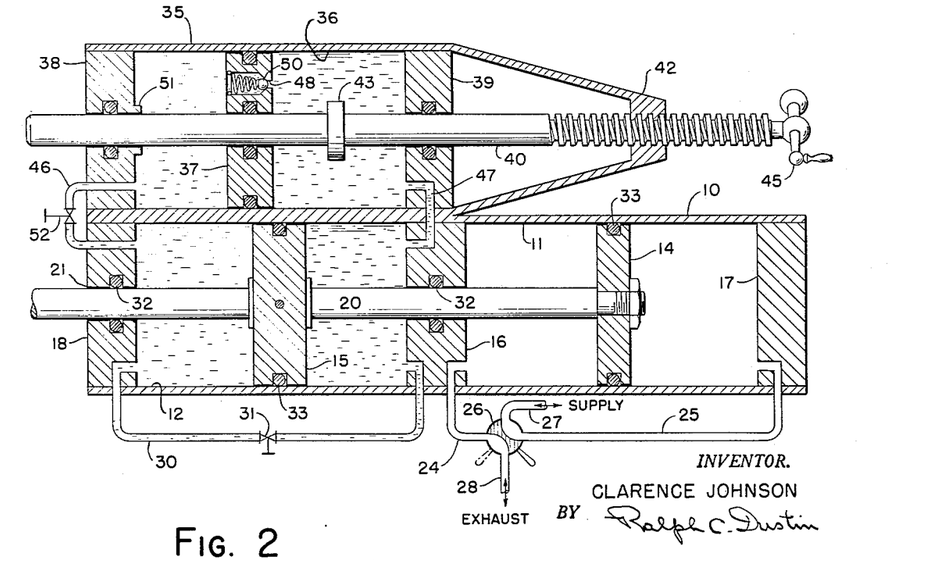
Figure 2 is an enlarged vertical sectional view of the improved motor shown in Figure 1 together with a control valve therefor.

Referring to the drawings wherein like reference numerals are used to indicate the same parts throughout the several figures and particularly to Figures 1 and 2 thereof, there is shown a milling machine 1 having a table 2 supported for reciprocating movement in a horizontal plane. The improved motor of this invention, generally designated 4, is carried by the machine and is operatively connected to the table in a manner to be hereinafter pointed out for reciprocating the latter relative to a cutting tool 5 driven by a motor 6. A workpiece 8 is fixed to the table by suitable means so that it is moved with the table past the cutting tool to have work performed thereon. It will be appreciated that this motor 4 may be used as well with a drill press or a machine lathe for positioning a cutting tool relative to a workpiece, or it may be used for positioning any object at different speeds, as desired.

The motor 4, as shown in Figure 2, includes a power cylinder 10 having alined bores 11 and 12 in which pistons 14 and 15 are reciprocably received. It is to be understood, however, that such separate bores and pistons are not essential and that a common piston operating in a single bore as hereinafter pointed out may be used in place of a cylinder having the separate bores 11 and 12 and pistons 14 and 15. A head 16 is fixed within the cylinder at a point between its ends, and cylinder heads 17 and 18 are attached to the ends of the cylinder for closing the outer ends of the bores. A piston rod 20 extends through an axial opening in the head 16 and is connected to pistons 14 and 15 so that the latter move together in their respective bores. Piston rod 20 also extends through an opening 21 in the cylinder head 18 and is connected, as shown in Figure 1, by a member 22 to the table 2 of the milling machine. Conduits 24 and 25 communicate with the opposite ends of cylinder bore 11 and are adapted to be connected by a suitable adjustable valve 26, shown here as a manual valve, selectively in communication with a pressure fluid supply connection 27 or an exhaust connection 28. The spaces in the cylinder bore 12 at opposite sides of the piston 15 are filled with a liquid, such as oil, and a passage 30 communicates with the opposite ends of this bore for conducting liquid from one end to the other around the piston 15 and is also filled with oil. A manually adjustable flow predetermining valve 31 is arranged in the passage means 30 for controlling the rate of flow of liquid therethrough. Arranged within the openings in the heads 16 and 18 are packing rings 32, generally known as O-rings, for preventing the escape of fluid along the piston rod. Surrounding the pistons 15 and 14 are similar packing or O-rings 33 for preventing the escape of fluid between the pistons and the walls of the cylinder bores.

A fixed cylinder 35, which may be formed integrally with cylinder 10 if desired, is provided having a bore 36 in which a piston 37 is reciprocably received. The opposite ends of the bore 36 are closed by cylinder heads 38 and 39. An adjustable stop and guide rod 40 extends through axial openings in cylinder heads 38 and 39 and piston 37 and has a slidable fit therein for a purpose to be presently described. The cylinder 35 extends beyond cylinder head 39 as shown and provides an end wall 42 having a threaded opening through which rod 40 is threaded. Fixed to rod 40 at a point between cylinder heads 38 and 39 is a stop member 43 for limiting the movement of piston 37 along rod 40 toward the right in Figure 2. At one end of rod 40 is a crank 45 adapted to be manually actuated for rotating rod 40 with respect to the threaded opening in wall 42 to effect axial feeding movement of rod 40 through heads 38 and 39 to position stop member 43 as desired. It will be seen that member 43 will be moved with the rod to vary the stroke of piston 37. Passage means 46 and 47 of equal flow capacity place the opposite ends of bore 36, which together with passages 46 and 47 is filled with oil, in communication with the opposite ends of bore 12. The opposite ends of bore 36 are adapted to be placed in communication with each other upon movement of piston 37 in one direction through a passage 48 extending through the piston 37 and controlled by a one way spring loaded valve 50 which when fully open permits a flow through passage 48 equal in capacity to the flow capacity of passages 46 or 47. The valve 50 normally prevents the flow of liquid through passage 48 but opens against the action of its spring to permit a comparatively free flow in the desired direction. The tension of the valve spring is so adjusted as to hold the valve closed until the pressure at the side of the piston opposite the valve spring becomes great enough to move the piston from member 43 to the left hand end of bore 36 and force the body of oil behind the piston through passage 46 into the end of bore 12. A projecting portion 51 is provided on cylinder head 38 for preventing the piston from engaging the head and cutting off the flow of liquid through passages 46 and 48. For regulating the high speed movement of the pistons 14 and 15, an adjustable predetermining valve 52 is provided in passage 46 to control the rate of flow of liquid therethrough. Suitable packing or O-rings are provided, as shown, for preventing the escape of liquid along rod 40 and the wall of cylinder bore 36.

The operation of this form of the invention is as follows: To move table 2 from right to left so that the tool may perform its operation on the workpiece, valve 26 is moved to the position shown in Figure 2 for supplying pressure fluid, preferably compressed air, to the right hand end of piston 14 and connecting the other end of piston 14 to exhaust. Piston 14 in this setting of valve 26 has the pressure fluid acting on its right end to move piston 14 to the left against the resistance to movement offered by piston 15 immersed in the liquid in the hydraulic control system. This resistance, due to the positive connection of pistons 14 and 15 through rod 20 and the fact that the hydraulic system is filled with liquid, is directly proportional to the rate of flow of oil in the hydraulic system which in turn is predetermined by valves 31 and 52 in passages 30 and 46. Assuming, therefore, that valve 31 is set to assure fluid flow at a rate to establish feed movement speed during working engagement of the tool and workpiece and that valve 52 is set to assure an initial additional fluid flow at a rate such that the combined rate of flow establishes the approach movement speed during movement of the tool toward the work, the liquid will be exhausted from the left end of bore 12 through passage 30 and passage 46 at a rate determined by the combined flow capacity of passages 30 and 46 and effect movement of piston 37 to displace liquid to the right of piston 37 through passage 47 into the right end of bore 12 at the same rate liquid enters cylinder 35 through passage 46. The movement of liquid from one end to the other of bore 36, so long as flow through the passage 46 is permitted by piston 37, will, therefore, be at a rate determined by the combined flow through passages 30 and 46 since piston 37 moves freely without any impeding effect. As a consequence, a comparatively fast approach movement of the pistons 14 and 15 will take place to bring the workpiece to the tool.

As soon as piston 37 engages member 43, flow through passage 46 is stopped and further flow of liquid is limited to the restricted passage 30. The pistons 14 and 15 thereafter move to the left at a slow speed, which is determined solely by the adjustment of the valve 31, takes place to feed the work at proper speed to the tool. The position of the member 43 is adjusted through the threaded connection between rod 40 and wall 42 so that the slow movement starts when the workpiece reaches the position at which the tool is to begin its cutting action. When the working stroke is completed, that is piston 15 engages head 18, the valve 26 is moved to a position for supplying pressure fluid to the left hand side of piston 14 and connecting the right hand side of this piston to exhaust. Pistons 14 and 15 are then moved to the right and the liquid flows from the right hand end of bore 12 through the passages 30 and 47. The liquid is conducted by passage 30 directly to the left hand end of bore 12, and the liquid at the left of piston 37 is conducted through passage 46 to the left hand end of bore 12. Since valve 48 is held closed with sufficient force to assure movement of piston 37 to the left so long as flow through passages 46 and 47 is substantially equal and the differential of pressure between opposite faces of piston 37 is negligible, this piston will then move in such direction at a speed equal to its approach movement until it engages the projecting portion 51 on head 38. During this time pistons 14 and 15 undergo reverse movement at approach movement speed.

Upon engagement of piston 37 and head portion 51, the pressure at the right hand side of valve 48 quickly increases to a point where the valve opens and permits the comparatively rapid flow from the right to the left hand end of bore 36 to be maintained since passages 47 and 48 are large enough to conduct liquid at a rate equal to the flow through the passage 46 when the valve 52 is fully opened. It will, therefore, be seen that pistons 14 and 15 move in bores 11 and 12 at a comparatively fast rate which is determined by the adjustments of valves 52 and 31. These pistons may then again be moved to the left at the same fast rate until piston 37 engages member 43. From then on, these pistons again move to the left at the comparatively slow rate determined only by the adjustment of valve 31.

This structure provides an efficient, compact fluid actuated motor and feed mechanism free of complicated valving, trips, and stops for moving a workpiece or a tool at a slow rate while work is being done, and at a fast rate while the workpiece and tool are being moved to and from working relation. It will be appreciated that the cylinders and pistons may be arranged in positions other than that shown, for example as shown in Figures 3 to 11 hereof, without changing the principle of operation of the motor. Instead of forming passage 48 in the piston 37, it could just as well be formed in the walls of the cylinders so as to provide a connection between the ends of bore 36 bypassing piston 37.

Figure 3:
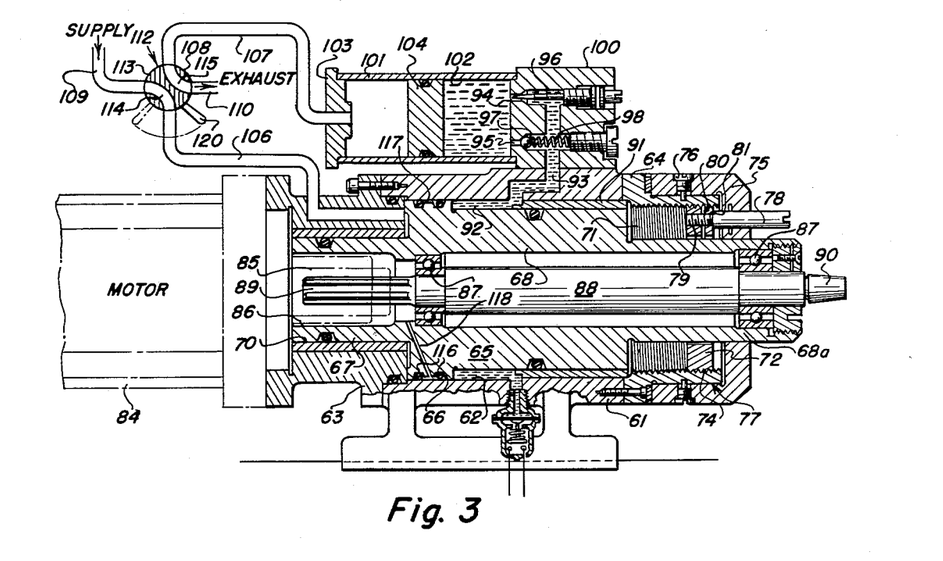
Figure 3 is a longitudinal sectional view of a drill mechanism embodying the improved motor of the present invention adapted to act as a drill feeding means.
Figure 4:
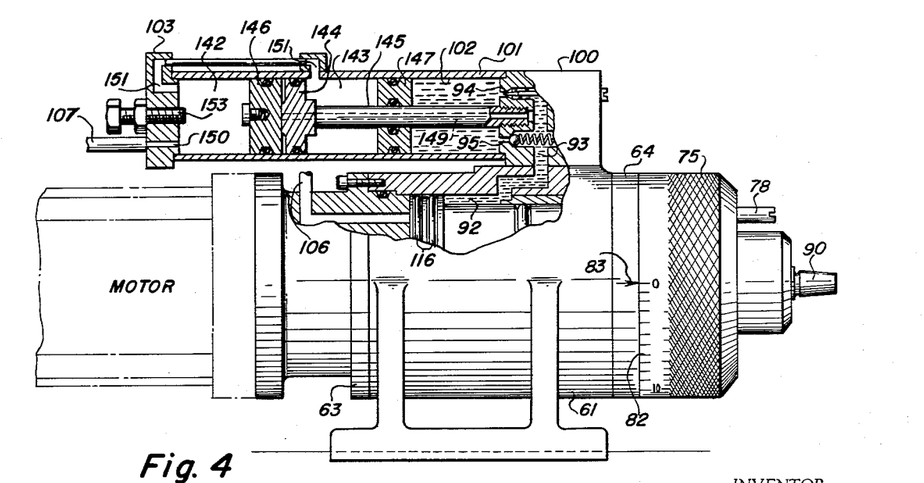
Figure 4 is a view partially in section of a drill mechanism embodying the improved motor of the present invention in a different form adapted to act as a drill feeding means.

Referring now to Figs. 3 and 4 wherein the cylinder-piston feed controller is used to establish a slow feed, quick return for a drill press feed, it will be noted that there is shown a drill feed mechanism including a cylinder 61 having a bore 62, provided at its respective ends with ringlike cylinder heads 63 and 64. Received within the cylinder is the drill quill in the form of a tubular piston 65 having a seal ring portion 66 slidably engaging the walls of the bore 62 and containing a piston seal ring structure of suitable construction. At opposite sides of portion 66 are reduced sealing extensions 67 and 68, the extension 67 being provided with a suitable sealing ring and slidably received in bore 70 of a bearing sleeve provided in head 63. Extension 68 is further reduced to provide a tubular nose 68a extending freely through space 71 in head 64 and being adapted upon forward movement of the piston to freely pass into space 71. A stop nut 72 is received within space 71 for engagement by the end of portion 68 of piston 65 to limit its forward movement, and threadedly engages the inner, tapped peripheral wall of head 64 as shown at 74 so that it may be axially adjusted for varying the travel of the piston.

Rotatably mounted on the forward portion of head 64 is a cap 75 held in place by screws 76 threaded into radial openings in the annular wall of the cap and having reduced diameter pin extensions received in an annular groove in the outer reduced peripheral wall 77 of head 64. A pin 78 is threaded into a tapped opening 79 in nut 72 and extends forwardly through an aligned plain opening in cap 75 so that rotation of the cap will be transmitted to nut 72. The portion of the nut 72 adjacent opening 79 is arcuately split, as at 80, and pin 78 is provided with a shoulder 81 engageable with the forward face of nut 72 so that the split portions, upon engagement of shoulder 81 and nut 72, will move relative to each other, and effect a locking of nut 72 in place. To change the position of nut 72, it is merely necessary to loosen pin 78 and then rotate cap 75. The pin may then be tightened for locking nut 72 in its new position. In order that the operator may accurately locate stop nut 72 after approximate adjustment of nut 72, there are provided, as shown in Fig. 4, markings 82 on the cap adapted to cooperate with a suitable reference marking 83 on the stationary head 64 to indicate increments of movement nut 72.

Fixed to cylinder head 63 in axial alignment with the cylinder is a power unit 84, which may take the form of a motor as indicated or may be a single or multistep driven pulley for receiving power through a drive belt connected to a remote power source. Unit 84 includes a rotatable power shaft 85 projecting into bore 86 which extends axially through piston 65. Arranged at spaced points in bore 86 are bearings 87 rotatably supporting a drill spindle 88 which is splined at one end, as at 89, to power shaft 85, and is provided at its other end with a member 90 adapted to receive a drilling implement, not shown. The bearings 87 are disposed in spaced bearing seats in bore 86 and are preloaded through a retainer nut threaded into the forward end of 86 and acting through the bearings and shoulders on the shaft 88 to secure shaft 88 and piston quill 65 against relative axial movement so that shaft 88 reciprocates with the piston. The splined driving connection permits relative reciprocation of shaft 88 and quill piston 65 with respect to power shaft 85 throughout the length of feed stroke for which the drill unit is designed.

Fitting within the space between the piston portion 68 and the wall of the bore 62 at its forward end is a bearing sleeve 91 slidably cooperating with the periphery of piston portion 68 which is provided with a suitable piston type seal to prevent fluid leakage along the piston and out the end of cylinder 61. The space 92 within bore 62 between piston portion 66 and sleeve 91 is connected by a passage 93 to ports 94 and 95 respectively controlled by metering valve 96 and one way valve 97. The valve 96 is adjustable manually to provide a restricted flow of fluid in either direction through port 94, and valve 97, shown herein as a ball type valve, is normally maintained in closed position by a spring 98 so as to prevent flow from passage 93 to the outlet port 95. The valves 96 and 97 are supported within a valve block 100 fixed to the side of the cylinder 61. Mounted upon block 100 is a cylinder 101 having its bore 102 communicating at one end with ports 94 and 95. A cylinder head 103 closes the other end of the bore 102, and a piston 104 having a suitable piston seal structure is slidably received within the bore. The space within the bore 102 at the right hand side of the piston 104, the ports 94, 95, the passage 93, and the space 92 within the bore 62 at the right hand side of the piston portion 66 are normally filled with a liquid, such as oil, and together provide a closed liquid circuit.

Movement of piston 65 to the right in Fig. 3 forces the oil from space 92 through passage 93 and restricted port 94 to cylinder bore 102. Valve 97 being closed at this time prevents the oil from passing through port 95. When piston 104 is moved to the right, oil is forced from cylinder bore 102 through both ports 94 and 95 to passage 93 and from there it is conducted to the space 92.

Opening into cylinder bores 62 and 102 at their left hand ends are passages 106 and 107 which are adapted to be selectively and alternately connected by a valve mechanism 108 to a fluid supply connection 109 or an exhaust connection 110. Valve mechanism 108 includes a valve body 112 rotatably received within a casing 113 and having arcuate ports 114 and 115 for connecting the fluid supply and exhaust connections selectively in communication with the passages 106 and 107. To prevent the pressure fluid and the oil from leaking past the pistons, there may be provided suitable packing means, as shown. Referring to the seal in piston portion 66, it will be noted that spaced packing rings 116, preferably of the well known O-ring construction, are disposed on opposite sides of an annular groove 117 which in turn communicates with a cross passage leading to an air space subjected to air at ambient air pressure. This type of seal assures escape of leakage air or oil to the atmosphere and is preferably provided at all points where pressurized air and oil simultaneously act on opposite sides of a passage to assure that air does not leak into the closed liquid circuit and destroy its non-compressible characteristic which is essential to maintain varying high speed-low speed change over points in actual use.

When the valve body 112 is in the position shown in Fig. 3, compressed air is supplied through passage 106 to cylinder bore 62 where it acts on the left end of piston portion 66 to move piston quill 65 to the right. The cylinder bore 102 at this time is connected to exhaust through passage 107 so that piston 104 moves without restriction to the left under influence of the oil forced into the right hand end of bore 102 through restricted port 94. Movement of piston quill 65 to the right is at a predetermined feeding rate adapted to advance the drilling implement toward and into the material being drilled, and the adjustment of the valve 94 determines the maximum rate of the drilling. When valve body 112 is moved to its opposite position indicated by the dotted line handle, the left end of cylinder bore 62 is connected to exhaust and the left end of bore 102 is connected to the air supply. Piston 104 is then forced by the pressure fluid to the right, and the oil in bore 102 is forced through the ports 94, 95 and passage 93 into bore 62 where it acts against the right hand end of piston portion 66 and moves piston quill 65 to the left. As a result of this movement, the drilling implement is moved away from the work, and the rate of movement is comparatively rapid by reason of the oil passing through both ports 94 and 95.

Figure 5:
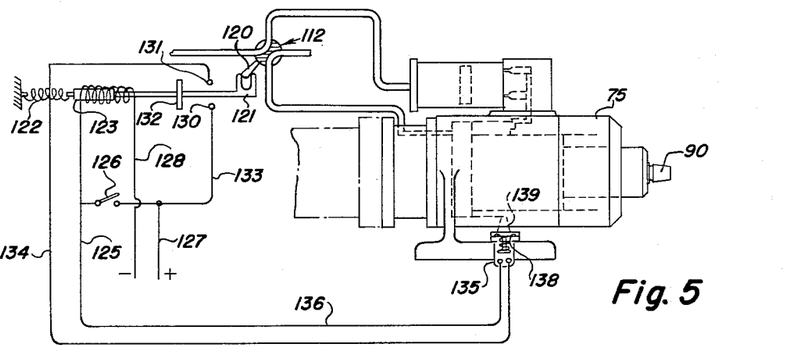
Figure 5 is a schematic diagram of a preferred form of automatic reversing control system for the feeding means of the drill mechanisms of Figures 1 to 4.

The valve member 112 is shown provided with an operating lever 120 so it may be moved to its different positions either manually or by some means operating automatically in response to pressures in the mechanism, as shown in Fig. 5. The valve positioning means of Fig. 5 includes a forked member 121 engaging lever 120 and normally held by a spring 122 in a position to supply compressed air to piston 104 and to exhaust air from piston 65. A normally deenergized solenoid 123 is operatively connected to member 121 for automatically moving the latter at the end of the retractile stroke to position valve member 112 so that air is supplied to piston portion 66 and exhausted from piston 104. The solenoid control circuit from end of the solenoid winding comprises a conductor 125, a manually operated switch 126, a conductor 127, and one side of a suitable electrical source. The other end of the winding is connected to a conductor 128 leading to the other side of the electrical source. Contacts 130 and 131, arranged for engagement by a contactor 132 when switch 126 is closed to energize the solenoid and move member 61 to the position for supplying pressure fluid to the piston 65, operate to close a solenoid holding circuit. This holding circuit comprises contact 130, a conductor 133, and conductor 127 leading to one side of the D. C. supply source, and contact 131, a conductor 134, the normally open contacts of a pressure switch 135, conductor 136, conductor 125, the coil of solenoid 123, and conductor 128 leading to the other side of the electrical source. The pressure switch 135 is responsive to the pressure in the closed liquid circuit and is preloaded so it normally maintains its contacts in open position and is adapted to be moved to its closed position when diaphragm 138 is subjected to abnormal pressures in the space 92 through a passage 139 in the cylinder 61. By provision of a sufficiently sensitive or suitably designed pressure switch 135, this automatic control can be adapted to automatically retract the drill in event of excessive resistance to feed movement of the drilling element, since the pressurized oil would continue to bleed through port 94 at its controlled rate at least until the pressure in the liquid circuit on opposite sides of valve 90 was equalized.

To start the drill piston moving to the right, the switch 126 is manually closed to complete a circuit from the power source through conductor 127, switch 126, conductor 125, the winding of the solenoid 123 and conductor 128 to the power source again. The energizing of the solenoid results in a movement of valve member 112 to a position for supplying compressed air to piston portion 66 and exhausting air from piston 104. This air supply effects movement of piston quill 65 to the right forcing oil from space 92 through restricted port 94 to the right of piston 104. The pressure within space 92 as a result of this movement and because of the restricted flow of oil is comparatively high and acts on diaphragm 138 to close switch 135. As soon as switch 135 is closed the holding circuit is closed through contacts 130, 131 and contactor 132 and a circuit is completed from the power source through conductors 127, 133, 134, 136, 125, the solenoid winding 123, and the conductor 128 to the power source again to retain valve member 112 in position to supply air to piston portion 66. The pressure switch 135 will be closed as soon as piston quill 65 starts its forward movement, and contactor 132 engages contacts 130, 131 as soon as valve member 112 reaches the position to supply pressure fluid to the drill piston. It will be seen that the holding circuit is established for the solenoid soon after switch 126 is closed, and switch 126 may then be moved to its open position. When the forward travel of the drill piston quill 65 is stopped by its engagement with stop nut 72, the pressure in space 92 drops and pressure switch moves to its open position for breaking the holding circuit. The forked member 121 is then moved to the left by spring 122 for positioning valve member 112 to exhaust fluid from the piston portion 66 and to supply compressed air to the left of piston 104. The pressure air moves piston 104 to the right forcing the oil through both of the ports 94, 95 to space 92 where it acts against the opposite face of piston portion 66 to move the drill piston quill 65 to the left at a comparatively high speed. The pressure in space 92 at this time is not high enough to close switch 135 since it is determined only by the resistance to movement of piston quill 65. If the drilling implement is unable to cut its way fast enough to enable the restriction to the flow of oil to maintain the pressure necessary to hold switch 135 closed, then this switch opens and causes the drill piston to move away from the work. To start any stroke of the drill piston, it is only necessary to close switch 126. The switch may be opened as soon as the piston moves forwardly, but the piston continues its forward stroke until it either engages the forward abutment or its feed movement is slowed down by the failure of the implement to cut its way.

Fig. 4 shows a mechanism like that just described except that it has control means which permits the drill to be fed forwardly at different speeds through different positions of its stroke. In this embodiment, there is provided a cylinder bore 102 divided into separate chambers 142 and 143 by a head member 144 held in a fixed position by a tube 145 having one end threaded into a through bore in head 144 and its other end threaded into a passage opening into passage 93 in the block 100. Arranged within chambers 142 and 143 are freely movable pistons 146 and 147, respectively, both pistons having sliding engagement with the walls of bore 102. The piston 147 also has sliding guided engagement with rod 145. The ports 94, 95 open into the chamber 143 at the right hand side of piston 147, and the passage provided by bore 149 of tube 145 connects the passage 93 directly to chamber 142 at the right hand side of piston 146. The pressure fluid connection 107 is connected through passage 150 to chamber 142 and through an enlarged tortuous bypass passage 151 to chamber 143 at their respective left hand ends. Threaded through an opening in cylinder head 103 is an adjustable abutment member 153 which is adjustable manually for varying the travel of piston 146. As a consequence of this passage structure, the relative piston areas and similar flow control factors well known in the art, a pressure differential is established between the air sides of chambers 142 and 143 during the power stroke of the unit to assure full travel of piston 146 against stop 153 before piston 147 starts to move.

When the drill piston quill 65 is moved to the right, oil is forced through restricted port 94 and the free passage 149 and acts on the right hand sides of pistons 147 and 146, respectively. The passage 149 permits the oil to flow comparatively freely so that piston quill 65 and the attached drilling implement move through an approach stroke rapidly toward the work. When piston 146 engages abutment member 153, oil can then pass only through restricted port 94. Thereafter the speed of movement of the piston quill 65 is reduced to provide the desired predetermined feeding movement. The length of the piston travel at high speed, i. e. the approach stroke, can be predetermined as desired by adjusting abutment member 153. When pressure fluid is supplied through passages 150 and 151 to the left hand sides of pistons 146, 147, the oil is forced through passage 149 and both ports 94, 95 to move the drill piston quill 65 and the attached drilling implement away from the work at high speed.

This modification, therefore, adapts the hydro-pneumatic feed unit of Figure 3 for feeding a drilling implement at different speeds relative to its work. It will be appreciated that any other tool may be connected to piston quill 65, if desired, in place of the drilling implement, or the piston portion 66 may be adapted to actuate means for reciprocating other elements or providing a pressing action.

Referring now to Figures 6 through 11, there is disclosed an hydro-pneumatic unit similar to that shown in Figure 4, the principal differences being (1) that the feed control cylinders are disposed in side-by-side relation rather than an in line relation, (2) the piston quill stop and adjustment mechanism is modified to provide an outboard support for the quill and an internal stop adjusting mechanism; and (3) the unit is provided with an automatic reversing switch taking the place of the manual starting switch 126 and separate pressure responsive switch 138.

Main cylinder 61, as in Figure 3, has its ends closed by ringlike heads 63a and a head 64a having a reduced axially extending annular portion 159 and contains a piston quill 65 having a piston portion 66 operatively cooperating with bore 62. A double seal structure including spaced rings 116, annular passage 117, and cross passage 118 venting the space between seals 116 to the atmosphere is provided on piston portion 66 as in Figure 3. Piston quill extension 67 extends into bore 70 of head 63a and cooperates with a fluid seal which is here mounted in an annular groove in bore 70 formed in the axially extending reduced portion of head 63a provided to fit within the end of bore 62. A similar fluid seal is preferably disposed in an external groove in this reduced portion of head 63a to seal the clearance space between the mating faces of head 63a and bore 62.

As in Figure 3, motor shaft 85 extends into bore 86 of piston quill 65 and is operatively connected to drill shaft or spindle 88 through spindle splines 89 at one end of shaft 88. A coupling sleeve 160 having a splined end cooperating with splines 89 and its other end non-rotatably connected to shaft 85. Shaft 88 is mounted in bearings 87 in the manner previously described and carries member 90 at its other end.

Piston quill extension 68 carrying tubular nose 68a as in Figure 3 both extend beyond bore 62 and into space 71 provided by the bore through head 64a. Stop nut 72 of Figure 3 is replaced in this embodiment by nut 163 threadedly engaging internal threads 165 provided in the bore of head 64a and having an axially directed peripherally opening slot 164. The outer or forward end of head portion 159 is provided with an annular flange 166 extending inwardly into engagement with the peripheral surface of nose 68a to provide an outboard bearing support for piston quill 65. Cap 75a, corresponding to cap 75 of Figure 3, telescopes over the reduced annular portion 159 of head 64a and is rotatably supported thereon by axially spaced annular lands 167 providing bearing engagement with the periphery of portion 159. A removable securing plate 168 secured to the end face of head portion 64a by screws 169 engages an internal axially facing shoulder 171 at the outer end of cap 75a to retain the cap against axial removal but does not wedge cap 75a against head 64a or bear against it sufficiently to interfere with its free rotation with respect to head 64a.

Head 64a adjacent the inner end 172 of cap 65a and the juncture of head 64a and reduced portion 159 is provided with a radial opening 173 (Figure 9) extending entirely through the thickness of portion 159 and axially for a sufficient distance to rotatably receive a pinion gear 174. Gear 174 is rotatably mounted on a pinion shaft 175 the ends of which are supported in a suitable axially extending bore formed in head 64a. Gear 174 is adapted to rotate around shaft 175 upon relative rotation of cap 75a and head 64a through engagement with internal gear teeth 176 formed on cap 75a. Through external teeth 177 provided on a ring gear 178 mounted for rotation in an internal recess formed in the inner end of head 64a gear 174 rotates ring gear 178 which is provided with a connector bar or key 179 having its free end slidingly received in external slot 164 formed in nut 163. Quill piston 65 at its end adjacent head 63a is provided with an anti-rotation locking pin or key 182 extending into a suitable bore 183 in head 63a. Pin 182 assures reciprocating movement only of piston quill 65 in cylinder 61. Rotation of cap 75a effects relative rotation of nut 163 and head portion 159 and through threads 165 effects relative axial movement of nut 163 with respect to quill piston 65 to the desired stop position. A friction locking pin 184 mounted for radial sliding movement in an opening (not shown) in the portion of head 64a surrounding the hub of gear 178 is adapted to be engaged by lock screw 185 threaded in head 64a and be forced into frictional contact with the hub of gear 178 to lock nut 163 and cap 75a in adjusted position.

Since this lock means acts on the gear 178, which is the driven member of the geared stop adjustment mechanism, a relatively great rotational force must be applied to cap 75a or nut 163 to overcome the frictional locking force of pin 184. Therefore, an extremely effective locking means is provided to assure maintenance of stop nut 163 in its predetermined adjusted position. Since no sufficient rotational force can be imparted to nut 163 from shaft 88 due to the purely reciprocatory movement of the interposed piston quill 65 and the clearance space between it and the internal bore of gear 178 and nut 163, there is no danger that the position of stop nut 163 will undergo any change once it is locked in adjusted position.

To guard against oil leakage along piston quill extension 68 and to provide the closed oil space 92 between extension 68 and bore 62, the right hand end of cylinder 61 is counter bored at 186 and provided with a closure seal supporting ring 187 having inner and outer seal rings of O-ring construction for sealingly engaging the periphery of piston quill extension 68 and counter bore 186. A suitable axially extending annular boss formed on the end face of head 64a opposite that containing reduced portion 159 fits into counterbore 186 where it abuts the end face of ring 187 to clamp ring 187 in place. At the same time, due to its axial dimension, this annular boss assures adequate clearance at the opposite ends of gear 178 to eliminate any possibility of the ends of gear 178 being clamped between ring 187 and portion 159 of hub 64a so as to interfere with its free rotation during adjustment of stop nut 163.

As in Figure 3, space 92 in bore 62 communicates with passage 93. In this embodiment, however, passage 93 as it passes into block 100a, which replaces block 100 of Figure 3, is enlarged to adapt it to receive spring 98 of one way valve 97 provided to normally close port 95, which in this embodiment is formed as an axial extension of passage 93. A cylinder 188 having an oil capacity about 50% greater than normally required by the unit to effect the normal stroke or travel of the power piston to provide a reserve supply effective to replace normal leakage and eliminate the need of frequent adding of oil to the unit through filler F. Cylinder 188 provides a bore 189 which corresponds to the chamber at the right hand end of head 144 of Figure 4 is provided in this form in place of the cylinder of Figure 4. While cylinder 188 may assume any suitable construction, it is here illustrated as a sleeve member 190 adapted to be mounted on block 100a and having removable closure heads 191 and 192 secured against axial removal by snap rings 193 and each having O-ring seals to prevent liquid leakage along the bore 189 of cylinder 188. To complete cylinder 188 and firmly secure heads 191 and 192 in proper position at the ends of sleeve 190 against rings 193, suitable outwardly opening, angularly spaced, axially directed, tapped bores 194 and 195 are provided in the respective heads. These bores are respectively adapted to receive mounting screws 196 and 197, which freely pass through suitable respectively aligned openings in block 100a and a closure plate 198 provided to abut the free end of sleeve 190 so that when tightened these screws, due to the engagement of their heads with block 100a and plate 198, will draw heads 191 and 192 against their respective rings 193 and, through said rings, draw sleeve 190 into tight mounted engagement with block 100a and plate 198 into tight abutting engagement with the opposite end of sleeve 190.

In order to provide communication between the interior of cylinder 188 and passage 95, block 100a is provided with a cross passage 200 intersecting passage 95 and leading to an enlarged eccentrically arranged annular recess 201 formed in the face of block 100a and adapted to receive an axially extending, concentric boss formed on the adjacent face of head 192. A suitable O-ring seal is preferably disposed in recess 201 for abutting engagement by the end face of the annular boss of head 192 to prevent leakage of liquid between block 100a and head 192. A through passage 202 formed in head 192 and concentric with the concentric boss connects recess 201 and the bore 189 of cylinder 188 and is of a sufficiently large diameter to encompass the end of passage 200.

Figure 6:
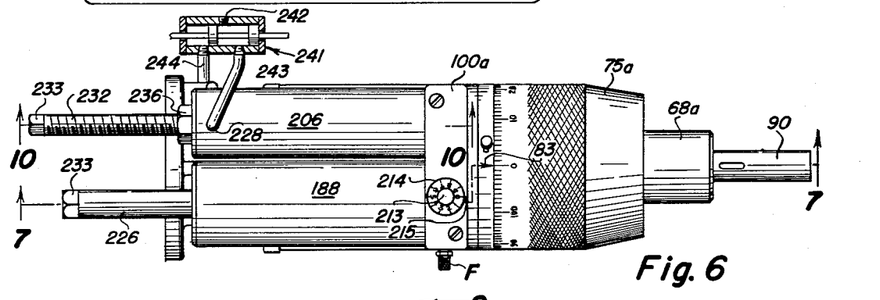
Figure 6 is a top plan view of a further adaption of the motor of this invention to service as a drill mechanism.
Figure 7:
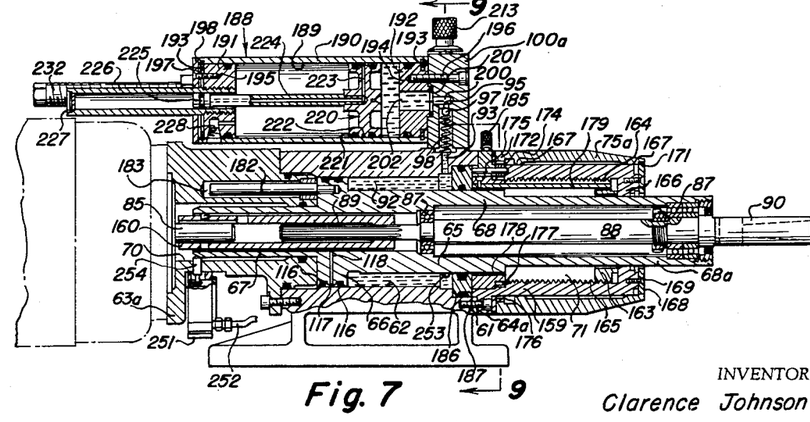
Figure 7 is a longitudinal sectional view substantially on line 7—7 of Figure 6.
Figure 9:
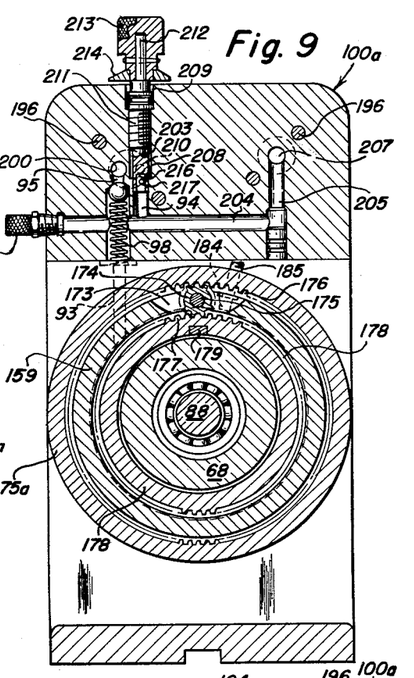
Figure 9 is a sectional view substantially on line 9—9 of Figure 7.
Figure 10:
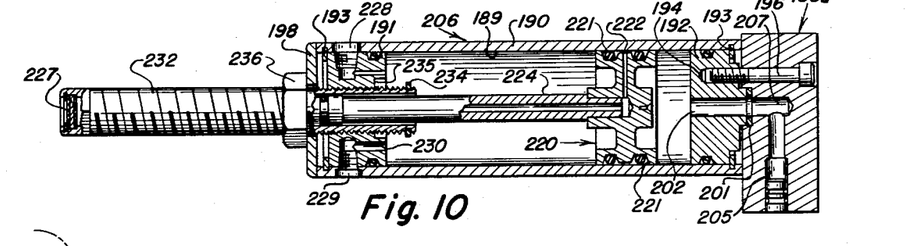
Figure 10 is an enlarged longitudinal sectional view substantially on line 10—10 of Figure 6.
Figure 11:
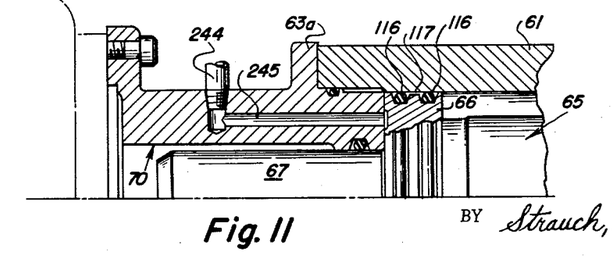
Figure 11 is an enlarged fragmentary sectional view of the device of Figure 7 taken substantially on line 11—11 of Figure 8 to show the air inlet to the power piston.

Passage 94 containing a metering valve 203 (Figure 9) is formed in block 100a with its axis paralleling passages 93 and 95 and is connected to passage 93 by a cross passage 204. As clearly seen in Figure 9, passage 204 extends from one side face of block 100a, through passage 93, intersects the lower end of passage 94, and continues across block 100a until it intersects a further passage 205 formed in block 100a with its axis paralleling passages 93, 94, and 95 and intersecting the axis of a further cylinder 206 (Figure 10) mounted on block 100a and, which, due to the extra oil capacity of cylinder 188, is made sufficiently smaller in diameter than cylinder 188, as shown in Figure 6, to assure proper operation of its piston 220 so long as the oil capacity in cylinder 188 exceeds the minimum required by the unit. At its outer end, passage 204 is provided with a filler fitting F provided to fill the fluid circuit as hereinafter pointed out. The construction of this further cylinder is substantially identical to that of cylinder 188 and, therefore, similar reference characters have been applied to the corresponding parts. Communication between bore 189 of cylinder 206 and passage 205 is obtained through cross passage 207 leading to the center of the annular recess 201 provided to receive the concentric boss of head 192 provided for cylinder 206 and the corresponding head passage 202. Passages 204, 205, 207 and 202 of cylinder 206 being unrestricted and of substantial size permit relatively free flow of liquid to or from the right end of cylinder 206 at all times. Passage 94 as clearly seen in Figure 9 is formed with spaced areas 208 and 209 of increasing diameter, the latter of which intersects the exposed end surface of block 100a and the former of which is intersected by a cross passage 210 (Figure 9) leading to recess 201 and head passage 202 of cylinder 188. Passage 208 is threaded to receive the threaded mounting body 211 of metering valve 203 the stem of which threadedly engages body 211 and extends in one direction into passage 94 and in the other direction out of body 211 and well above the surface of the exposed end face of block 100a as indicated by numeral 212. End 212 is non-rotatably connected to an adjustment knob 213 provided with an annular graduated disk 214 adapted to cooperate with a reference mark 215 (Figure 6) provided on the exposed end face of block 100a to indicate the rate of flow for the various adjustments of the metering valve 203.

Flow from passage 94 to cross passage 210 is effected through a counterbored passage 216 formed in the end portion of the stem of valve 203 and a radial cross passage 217 of restricted diameter intersecting passage 216 and the exterior annular surface of the aforesaid end portion of the valve stem. In the fully closed position of valve 203 illustrated in Figure 9, passage 217 is disposed below the line of intersection of bore 94 and its area 208 of increased cross-sectional area. In this position, flow through metering valve 203 is prevented by the wall of passage 94 and liquid is prevented from flowing in either direction from passage 204 to passages 210 and 202 of cylinder 188. Upon rotation of knob 213 to an open valve position, the threaded engagement between the stem and body 211 will effect an axial outward movement of the stem and passage 217 will be moved into partial or full communication with area 208 of passage 94, depending upon the extent of rotation of knob 211, and deliver a predetermined metered amount of liquid through passages 210 and 202 to the right hand end of cylinder 188. This metered flow together with the relatively free flow from passage 204 to the right hand end of cylinder 206 is used to predetermine the rate of rapid movement of piston quill 65 in one direction while the metered flow alone is used to determine the rate of slow or feed movement of piston quill 65 in this same direction. Reverse flow through both of the aforementioned paths and in addition through passage 95 is used to predetermine the rate of reverse movement of piston quill 65. The manner of use of these controlled flows will now be described in conjunction with the novel feed piston control system of this embodiment.

This feed control, like that of the previous embodiments, does not involve complicated valving or exposed and mechanically actuated trips and stops. It consists of a feed control piston 220 in cylinder 188 and an identical but proportionately small feed control piston in cylinder 206. While any suitable piston structure having sliding and sealing engagement with bores 189 of the cylinders might be used, the piston structures shown are preferred and include vented, double O-ring seals and guide structure in the form of telescoping sleeves and tubes which may, if desired, be used as piston stops.

Referring first to cylinder 188, piston 220 has spaced annular grooves 221 adapting it to receive a pair of O-rings and an intermediate shallow annular groove 222 which intersects a radial bleed passage 223 formed in the body of the piston. Piston 220 in its face opposite that facing passage 202 is provided with a tapped bore for threadedly receiving the reduced threaded end of a combined bleed and guide tube 224 the bore of which communicates with passage 223 through a suitable cross passage formed in the reduced end. The opposite end of tube 224 is provided with an enlarged annularly grooved head 225 adapted to carry an O-ring and slidingly and sealingly engage the bore of breather tube 226 screw threadedly mounted in a concentric tapped bore in head 191. The outer end of the bore of tube 226 is preferably provided with a suitable air filter 227 while the inner end directly communicates with the bore of tube 224. From the foregoing description, it will be appreciated that piston 220 divides cylinder 188 into two chambers which correspond to the chambers at opposite sides of pistons 104 and 147 of Figures 3 and 4.

The left hand chamber of cylinder 188, like the previously described corresponding chambers of the prior embodiments, is adapted, through an air inlet passage 228 (shown slightly out of its proper plane in Figure 7 as will be apparent from reference to Figure 8), to be connected either to a source of compressed air or an exhaust passage leading to the atmosphere. The cylinder 206 is provided with a piston bleed and guide structure and an air inlet exactly like that just described, except that air inlet 228 is at the top of the cylinder and the passage 229 located in the same position as passage 228 of cylinder 188 serves as an air outlet to by-pass air from the left end of cylinder 206 through a passage 230 larger than the entry passage from inlet 228 and conduit 231 to inlet 228 of cylinder 188. This structure, like the similar structure of Figures 3 and 4, assures a full stroke of piston 220 of cylinder 206 before any effective movement of piston 220 of cylinder 188 takes place during the power movement of piston quill 65. Also breather tube 226 is replaced by a combined breather and piston stop tube 232. The only difference between tubes 226 and 232 is that the latter is threaded throughout its length and is slightly longer to permit it to be threaded into the left end of cylinder 206 to selectively predetermine the extent of movement of piston 220 of cylinder 206 and consequently the extent of rapid or approach movement of piston quill 65 in its feed direction.

Both tubes, as clearly seen in Figure 6, have hexagonal wrench surfaces 233 adapting them to be screwed into heads 191. Tube 232, in addition, is provided at its inner end with an annular groove in which is disposed a snap ring 234 adapted to abut the radial shoulder 235 formed by a counterbore in cylinder 191 when tube 232 reaches its non-stop position. This stop acts as a warning to the operator that the controls are set to permit rapid movement for the full length of movement of piston quill 65 in its feed direction. Tube 232 also is preferably provided with a locknut 236 adapted to lock it in adjusted position against the loosening vibration that may result from abutting engagement of piston 220 in use of the mechanism.

Figure 8:
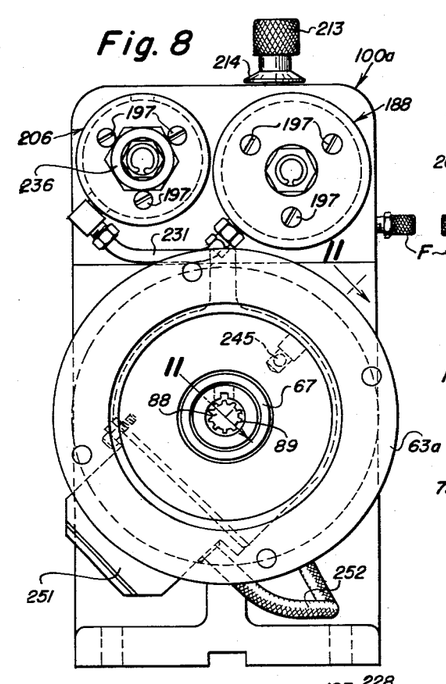
Figure 8 is an enlarged end elevation as viewed from the left of Figure 6.

In this form of the invention, manual control valve 112 is replaced by a four way air valve 241 (Figure 6) having an air pressure inlet 242 and supply passages 243 and 244 respectively leading to the left hand end of cylinder 206 and to the air inlet passage 245 (Figure 11) formed in head 63a and leading to the left hand side of piston portion 66 of piston quill 65. These supply conduits are adapted to be alternately connected to inlet 242 or to exhaust through the opposite ends of the valve. Valve 241 may be controlled manually or in well known manner by a solenoid either in a control system like that shown in Figure 5 or, as indicated in Figure 8, a control system employing a solenoid 123 and control circuits similar to Figure 5 and an automatic reverser switch indicated generally by reference numeral 251. Switch 251 may be of any suitable construction wherein the switch contacts, corresponding to those of switch 126, contacts 130 and 131 and contacts 135 and 138, are closed in the order previously described and maintained closed to complete the solenoid holding circuit in response to pressure in space 92 to maintain air pressure to the left of cylinder so long as piston quill 65 moves to the right. Such pressure may be transmitted to switch 251 through a conduit 252 connected to a passage 253 (Figure 7) leading to the forewardmost end of space 92. In addition, switch 251 must have a switch plunger 254 (Figure 7) adapted upon return of piston quill 65 to its fully retracted position to automatically, even though momentarily, close the solenoid circuit through the starter switch corresponding to manual switch 126 to initiate the air supply to piston portion 66 and to exhaust cylinders 188 and 206. Since the structure of the remainder of such a switch will be obvious to those skilled in the art and as, apart from its functional operation in the control system, it forms no part of the present invention disclosure of the further details is not deemed necessary here.

Starting with the mechanism in the position shown in the drawings, namely, just as piston quill 65 approaches its fully retracted position and assuming the passages 92, 93, 94, 95, 200, 201, 202, 204, 205, 207 and 252 and the portions of cylinders 188 and 206 to the right of pistons 220 to be filled with oil, the operation of this form of the invention is as follows:

The end of piston quill extension 67 will press switch plunger 254 inwardly to close the starting switch thereby energizing solenoid 123 which, due to its operative connection with valve 241, will move valve 241 to connect compressed air inlet 242 to supply conduit 244 and supply conduit 243 to exhaust. Air pressure will then become effective on piston portion 66 of piston quill 65 and the right hand ends of cylinders 188 and 206 will be connected to exhaust. Piston quill 65 together with spindle 88 or other implement will be strongly urged to move in a forward direction. Assuming a tool feed as illustrated, the only resistance to such movement will be the liquid flow restriction imposed by metering valve 203 and passages 204, 205, 207 and 202 leading to the right of cylinder 206 since both feed control pistons 220 in cylinders 188 and 226 are free to move. A rapid or approach movement of piston quill 65 will, therefore, result and the pressure on the liquid, due to this movement, will be raised sufficiently to be effective through passage 252 to close and hold switch contacts of the holding circuit corresponding to 135 and 138 closed through a contactor other than that operated by plunger 254. Consequently, air pressure will continue to be effective to move piston quill 65 in its forward direction at high speed.

Since the volume of flow to cylinder 206 is much greater during this stage of operation than that to cylinder 188, piston 220 of cylinder 206 will be forced into contact with stop sleeve 232 well before piston 220 of cylinder 188 reaches the end of its stroke. As soon as stop sleeve 232 is contacted, piston 220 of cylinder 206 ceases to move and flow of liquid into cylinder 206 will be stopped because of the incompressible characteristic of liquids. Thereafter, the only path of flow of the liquid is through metering valve 203 which will immediately take over sole control of the piston quill movement and slow it down to the predetermined feed speed. This slow feed movement continues until the end of piston quill extension 68 engages stop nut 163. Forward piston quill movement is then positively prevented by stop nut 163, the liquid pressure in space 92 will fall to its normal value (atmospheric) due to the free movement of pistons 220 against the pressure of the atmosphere, and as a result of this pressure drop the pressure applied to switch 251 through conduit 252 will also drop opening contacts 135 and 138 and breaking the holding circuit through solenoid 123. Valve 241 will then move to its other operative position either under influence of a spring such as spring 122 or a solenoid in a low pressure control circuit established by pressure switch 251.

Air under pressure will then be delivered to the left of both pistons 220 which will act to force liquid in a reverse direction through metering valve 203 and passages 94, 207, 205, 204 and open one way valve 97 to also force liquid through passage 95 and finally through passage 93 into space 92. The liquid flow being quite high due to the additional flow through passage 95 and the left hand end of piston portion 66 being open to exhaust and, therefore, free to move, piston quill 65 will snap back to its original retracted position and actuate plunger 254 to recycle the operation. This series of movements will continue until the electrical power source is disconnected from the pressure switch by means of the conventional manual switch provided for this purpose.

It will be appreciated that stoppage of the forward feed of piston quill 65 for any reason, for example, the encountering of a hard spot by a drill, to relieve or lessen the effect of the air pressure through piston portion 66 on the liquid, will cause a pressure drop in the liquid. Since even a momentary slowing down will result in a substantial drop in liquid pressure, switch 251 will be actuated through conduit 252 to break the holding circuit and reverse valve 241 to retract the piston quill and drill. Thus an extremely effective simple, and inexpensive automatic feed mechanism, may be provided in accord with the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power feed mechanism comprising a power cylinder and piston; means to connect said power cylinder and piston to a source of fluid pressure for imparting movement to said power piston; a control system for said power piston comprising a closed liquid circuit connected to said power cylinder including at least two branches through which said liquid is constrained to flow to determine the rate of movement of said power piston; a flow control piston in said liquid circuit adapted to move freely through a stroke of predetermined length under the influence of liquid flow through one of said branches; and stop means for arresting the movement of said control piston at the end of said predetermined stroke whereby flow thereafter is maintained in said circuit at a reduced rate to establish a lower rate of movement for said power piston.

2. The combination defined in claim 1 wherein said stop means comprises an adjustable stop adapted to be set to arrest movement of said flow control piston at a predetermined point within the limits of its stroke whereby the movement of said power piston at its determined rate of movement may be arrested at any desired point within the limits of its stroke.

3. The combination as defined in claim 1 together with means for connecting said power piston to exhaust and simultaneously connecting said control piston to a source of fluid under pressure whereby said control piston and said liquid are adapted to respectively move and flow in reverse direction under the influence of said fluid pressure source and wherein said liquid circuit contains a third branch having a one way valve therein operable to permit liquid flow in one direction only therein whereby the rate of movement of said power piston in one direction is determined by the rate of liquid flow through each of said three branches whereby movement of said power piston in opposite directions is affected at different rates.

4. The combination defined in claim 1 wherein said power piston comprises a sleeve having an external piston portion sealingly engaging the bore of said power cylinder; external sealing elements at opposite sides of said piston portion and adapted to cooperate with end sealing elements provided at the opposite ends of said cylinder bore, and internal bearing seats adapted to receive a motion transmitting element for transmitting movements of said power piston to a device to be operated thereby.

5. A power feed mechanism comprising a power cylinder and piston adapted for connection to a machine tool to effect relative movement of the tool and work piece; a control valve operable to connect said power feed mechanism to a source of pressure and exhaust to alternately effect movement of said power piston through an advance and a retract stroke; a hydraulic control system controlling movement of said power piston in both directions and comprising a plurality of control pistons; a closed liquid circuit having a plurality of passages through which liquid is constrained to flow at different predetermined rates, each of said passages connecting said power piston and one of said control pistons, and stop means for arresting movement of one of said control pistons during the advance stroke of said power piston to prevent flow through one of said passages and thereby decrease the rate of advance of said power piston.

6. The combination defined in claim 5 wherein one end of said power cylinder forms one terminal of said closed liquid circuit, the other end of said power cylinder is connected to the pressure source to apply pressure, during the advance stroke of said power piston, to said power piston on the face opposite that contacted by said liquid, and wherein said other end of said power cylinder is connected to exhaust and pressure is applied to the face of said control pistons opposite that contacted by said liquid to effect the retract stroke of said power piston through movement of said control pistons and said liquid under influence of said pressure.

7. The combination defined in claim 5 together with automatic control valve reversing mechanism comprising a solenoid having a spring biased armature adapted to engage said control valve and normally position said control valve to supply pressure to said control pistons; a source of electrical energy; a starting circuit including said source of electrical energy, the coil of said solenoid, and a manual starting switch adapted when closed to energize said solenoid and shift said control valve to supply pressure to said other end of said power cylinder and initiate the advance stroke of said power piston; and a holding circuit including said source of electrical energy, the coil of said solenoid, and a pressure responsive switch communicating with said one end of said power cylinder and acting in response to the pressure built up in the liquid in said end of said power cylinder as a result of the restricted liquid flow through said passages upon initial and continued power movement of said advancing piston to close said holding circuit and maintain a supply of pressure to said one end of said power cylinder only so long as the advance stroke of said power piston continues at the predetermined rate.

8. The combination defined in claim 5 together with automatic recycling control valve mechanism comprising a solenoid having a spring biased armature adapted to engage said control valve and normally position said control valve to supply pressure to said control pistons; a source of electrical energy; a starting circuit including said source of electrical energy; the coil of said solenoid, and a plunger operated starting switch adapted to be moved to closed position by a portion of said power piston at the end of the retract stroke of said piston to thereby energize said solenoid and shift said control valve to supply pressure to said other end of said power cylinder and initiate the advance stroke of movement of one of said control pistons during the advance stroke of said power piston to reduce said flow rate in said circuit and thereby reduce the rate of movement of said power piston.

18. The power mechanism according to claim 17 wherein said control means comprises a valve operable in a first position to supply pressure to said power piston and connect said control pistons to exhaust to advance said power piston and operable in a second position to reverse said connection to retract said power piston, means operable at the end of said advance stroke to move said valve to said second position; and means operable at the end of said retract stroke to move said valve to said first position.

19. A power feed mechanism comprising a power piston movable in a power cylinder, means connecting one end of said power cylinder selectively to pressure and exhaust to move said power piston, a plurality of control pistons movable in respective control cylinders, a closed liquid circuit having parallel fluid branches connecting the opposite end of said power cylinder to one end of each of said control cylinders whereby the rate of movement of said power piston is controlled by the rate of movement of said control pistons, and means for controlling the movement of at least one of said control pistons during said movement of said power piston to thereby control the rate of movement of said power piston.

20. A power feed mechanism according to claim 19 together with means for varying the length of the stroke of said one of said control pistons.

21. A power feed mechanism having a power piston movable through an advance and a retract stroke; a control system for said power piston comprising first and second control pistons, a closed liquid circuit having first, second and third parallel branches, said first and second branches connecting one side of said power piston and one side of said first control piston, said third branch connecting one side of said power piston and one side of said second control piston, means restricting the flow in said first fluid branch, means for preventing flow in said second branch from said power piston to said first control piston, and means for arresting movement of said second control piston during the advance stroke of said power piston whereby said power piston initially advances at a rate determined by the flow of fluid through said first and third branches and after the movement of said second control piston is arrested advances at a rate determined by the flow through said first fluid branch.

22. A hydro-pneumatic power system comprising; a power piston movable through an advance and a retract stroke; means forming a closed hydraulic circuit for controlling the movements of said power piston, said circuit connecting one side of said power piston and one side of a plurality of control pistons; valve means operable in first and second positions, respectively, to selectively apply pneumatic pressure to the opposite side of said power piston to advance said power piston and to the opposite side of said control pistons to retract said power piston, said pneumatic pressure creating a pressure in said closed hydraulic circuit which drops at the end of the advance stroke of said power piston; an electrical control circuit for controlling the position of said valve means; operating means for shifting said valve means; a starting element in said control circuit adapted, when closed, to render said operating means effective to shift said valve means to said first position to apply pneumatic pressure to advance said power piston; switch means in said circuit; a hydraulic actuator for said switch means connected to said closed hydraulic circuit and adapted to be operated by a preselected pressure drop therein to actuate said switch means to render said operating means effective to shift said valve means to said second position to apply pneumatic pressure to said control pistons and retract said power piston; and mechanical means operable at the end of a retract stroke of said power piston to restore the electrical control circuit to its initial condition.

23. In a hydro-pneumatic power system having a power piston movable through an advance and retract stroke under the control of fluid flow in a closed hydraulic circuit, said circuit connecting one side of said power piston and one side of a plurality of control pistons; valve means for selectively applying fluid pressure to the opposite side of said power piston for advancing said power piston and to the opposite side of said control pistons to retract said power piston, said pneumatic pressure creating a pressure in said closed circuit which drops at the end of the advance stroke of said power piston; an electrical control circuit including a solenoid for operating said valve means; a starting element adapted, when closed, to energize said control circuit and said solenoid to operate said valve means to apply pneumatic pressure to advance said power piston; switch means in said electrical control circuit; and a hydraulic actuator for said switch means connected to said closed hydraulic circuit and adapted to be operated by a preselected pressure drop therein to actuate said switch means and deenergize said control circuit whereby said solenoid operated valve is operated to apply pneumatic pressure to said control pistons to retract said power piston.

24. A power feed mechanism comprising an expansible power chamber having a movable wall; an expansible control chamber; means to connect said power chamber to a source of fluid under pressure to apply pressure against one surface of said wall to thereby move said wall; a control system for regulating the rate of movement of said wall comprising a closed liquid circuit connected to the other surface of said wall and having a plurality of passages through which fluid is constrained to flow to determine the rate of movement of said wall, at least one of said passages being connected to said control chamber; a movable wall in said control chamber adapted to move freely a predetermined distance under the influence of liquid flow through said one of said passages; and stop means for arresting the movement of said wall of said control chamber at the end of said predetermined distance whereby flow thereafter is maintained in said circuit at a reduced rate to establish a lower rate of movement for the movable wall of said power chamber.

25. A power mechanism comprising a power member movable through an advance and retract stroke under the control of the flow of fluid in a closed hydraulic circuit, the pressure in said hydraulic circuit dropping when said advance stroke is interrupted; a valve selectively operable to supply fluid to said mechanism to advance and retract said power member; an electrical control circuit, including a solenoid for actuating said valve, adapted to be connected to a source of electrical energy and, when energized, to energize said solenoid to shift said valve and supply fluid to advance said power member; switch means in said electrical control circuit; means responsive to a predetermined drop in the pressure in said hydraulic circuit for actuating said switch means to deenergize said solenoid whereby said valve is shifted to supply fluid to retract said power member; and additional means responsive to the movement of said power member to its retracted position to actuate said switch means to restore said electrical control circuit to its initial condition.

26. A power mechanism comprising a power member movable through an advance and retract stroke under the control of the resistance flow of fluid in a closed hydraulic circuit, the pressure in said hydraulic circuit dropping when said advance stroke is interrupted; a valve selectively operable to supply fluid to said mechanism to advance and retract said power member; an electrical control circuit, including a solenoid for actuating said valve, adapted to be connected to a source of electrical energy and, when energized, to energize said solenoid to shift said valve to advance said power said power piston; and a holding circuit including said source of electrical energy, the coil of said solenoid, and a pressure responsive switch communicating with said one end of said power cylinder and acting in response to the pressure built up in the liquid in said end of said power cylinder as a result of the restricted liquid flow through said passages upon initial and continued advancing movement of said power piston to close said holding circuit and maintain a supply of pressure to said one end of said power cylinder only so long as advancing movement of said power piston continues at the predetermined rate.

9. The combination defined in claim 1 wherein said closed liquid circuit has a third branch terminating in a movable control piston, one end of said power cylinder forms one terminal of said closed liquid circuit and the other end of said power cylinder is connected to the pressure source to apply pressure during the advance stroke of said power piston, to said power piston on the face opposite that contacted by said liquid, and wherein said other end of said power cylinder is connected to exhaust and pressure is applied to the faces of said control pistons opposite those contacted by said liquid to effect the retract stroke of said power piston through movement of said control pistons and said liquid through all three branches under influence of said pressure.

10. A motor comprising, in combination, a cylinder having a bore containing a piston, means for connecting the opposite ends of said bore selectively to pressure fluid supply and exhaust, a second cylinder having a bore containing a piston, means connecting said pistons for movement together, means carried by said pistons for transmitting motion to a device to be actuated, a third cylinder having a bore containing a piston, adjustable abutment means for limiting the movement of said last mentioned piston, restricted passage means for connecting the opposite ends of the bore in said second cylinder in communication with each other, passage means for connecting the opposite ends of the bores in said second and third cylinders in communication with each other, passage means for connecting the opposite ends of said third cylinder bore in communication with each other, and valve means cooperating with said last mentioned passage means for preventing the flow of fluid therethrough in one direction, the spaces in said second and third cylinder bores and the passage means communicating therewith being filled with a liquid.

11. A motor comprising, in combination, a cylinder having a bore containing a piston, means including a valve for connecting the opposite ends of said bore to pressure fluid supply or to exhaust, a second cylinder having a bore containing a piston, means connecting said pistons for movement together, means for transmitting motion from said pistons to a device to be actuated, a third cylinder having a bore containing a piston, adjustable abutment means for limiting movement of said last metnioned piston, restricted passage means for connecting the opposite ends of the bore in said second cylinder in communication with each other, passage means for connecting the opposite ends of the bores in said second and third cylinders in free communication with each other, passage means for connecting the opposite ends of said third cylinder bore in free communication with each other, valve means for preventing the flow of fluid through said last mentioned passage means in one direction, and a liquid filling the spaces in said second and third cylinder bores and the passages communicating therewith.

12. A power mechanism comprising, in combination, a cylinder having a bore containing a piston, means including a valve for connecting the opposite ends of said bore to pressure fluid supply or to exhaust, a second cylinder having a bore containing a piston, means including a piston rod connecting said pistons for movement together, said piston rod adapted for connection to a device to be actuated, a third cylinder having a bore containing a piston, a rod extending longitudinally through said third cylinder and through an opening in the piston contained therein, a member fixed to said rod for limiting the movement of the piston in one direction, means for adjusting said rod longitudinally through said third cylinder, restricted passage means connecting the opposite ends of the bore in said second cylinder in communication with each other, passage means connecting the opposite ends of the bore in said second cylinder in free communication with the opposite ends of the bore in said third cylinder, means for passing fluid in one direction between the ends of the bore in said third cylinder and preventing flow in the opposite direction, and a liquid filling the spaces in said second and third cylinder bores and the passage means communicating therewith.

13. The mechanism of claim 12 in which said means for passing fluid comprises a passage opening through the piston in the bore of said third cylinder and containing valve means movable in one direction to an open position.

14. The mechanism of claim 12 in which said means for passing fluid comprises a passage opening through the piston in said third cylinder, a valve member for preventing flow through said passage in one direction, and a spring for yieldingly urging said valve member to a closed position.

15. A power mechanism comprising, in combination, a cylinder providing bores in axial alinement, means including a valve for connecting the ends of one of said bores selectively to pressure fluid supply and to exhaust, pistons reciprocably received in said bores and connected by a piston rod for movement together, said piston rod adapted for connection to a device to be actuated, passage means connecting the ends of the other cylinder bore in communication with each other, an adjustable valve for restricting the flow of fluid through said passage means, means providing a third cylinder bore, a piston reciprocably received in said third cylinder bore, adjustable abutment means for limiting the movement of said last mentioned piston in one direction, passage means providing free communication between the ends of said other cylinder bore and said third cylinder bore, adjustable valve means for varying the communication through one of said last mentioned passage means, means for passing fluid between the ends of said third cylinder bore in one direction and preventing flow in the opposite direction, and a liquid filling said passage means and the cylinder bores communicating therewith.

16. A hydro-pneumatic motor comprising a power cylinder containing a power piston; a control system for connecting said power piston selectively to a pressure supply and exhaust; a second cylinder containing a first follower piston; means carried by one of said pistons for transmitting motion to a device to be actuated; a third cylinder containing a second follower piston; adjustable abutment means for limiting the movement of one of said follower pistons; a plurality of passage means connecting said power cylinder and said second and third cylinders, the spaces in said second and third cylinders and the passage means communicating therewith being filled with a liquid; and valve means cooperating with certain of said passage means for preventing the flow of liquid therethrough in one direction.

17. A power mechanism having a power piston movable through an advance and retract stroke at a rate determined by the rate of flow of liquid in a closed circuit, said circuit having a plurality of branches respectively connecting one side of said power piston and one side of a plurality of control pistons, control means for selectively connecting the opposite sides of said power piston and said control pistons to pressure and exhaust to alternately effect movement of said power piston through said advance and retract stroke; and means for arresting member; a holding circuit to maintain said solenoid energized during the advance stroke of said power member; switch mechanism in said electrical control circuit; means responsive to a predetermined drop in pressure in said hydraulic circuit operable to actuate said switch mechanism to open said holding circiut and thereby de-energize said solenoid whereby said valve is shifted to retract said power member; and means operable when said power member is fully retracted to actuate said switch mechanism to place said control circuit in its initial condition.

27. A power feed mechanism comprising a power member movable in a confined space; means to connect one side of said power member to a source of fluid pressure for imparting unidirectional movement to said power member; a control system for said power member comprising a closed circuit connected to the other side of said power member including at least two branches in which liquid may flow to determine the rate of movement of said power member in said one direction; a flow control member in one of said branches adapted to move freely and permit free flow of said liquid in said one branch through a predetermined increment of movement of said power member in said one direction; means for arresting movement of said flow control member at the end of said predetermined increment of movement of said power member whereby liquid flows in said liquid circuit thereafter only through the others of said branches to establish a lower rate of movement for said power member; and means for controlling the rate of flow of fluid flow through the others of said branches.

References Cited in the file of this patent

UNITED STATES PATENTS

| | | |
|---|---|---|
| 649,357 | Ridgway | May 8, 1900 |
| 706,688 | Reynders et al. | Aug. 12, 1902 |
| 789,566 | Riddell | May 9, 1905 |
| 897,676 | Thompson | Sept. 1, 1908 |
| 1,339,306 | Alter | May 11, 1920 |
| 1,431,248 | Norris | Oct. 10, 1922 |
| 1,923,595 | Temple | Aug. 22, 1933 |
| 1,998,873 | Kingsbury | Apr. 23, 1935 |
| 2,285,863 | Jeffrey | June 9, 1942 |
| 2,361,326 | Silver | Oct. 24, 1944 |
| 2,379,683 | Cones | July 3, 1945 |
| 2,430,019 | Jenkins | Nov. 4, 1947 |
| 2,442,306 | McCormick | May 25, 1948 |
| 2,456,431 | Price | Dec. 14, 1948 |
| 2,605,748 | Rasoletti | Aug. 5, 1952 |

FOREIGN PATENTS

| | | |
|---|---|---|
| 619,123 | Great Britain | Mar. 13, 1949 |